(12) United States Patent
Kuwamura et al.

(10) Patent No.: US 11,092,026 B2
(45) Date of Patent: Aug. 17, 2021

(54) ROTARY MACHINE

(71) Applicant: Mitsubishi Hitachi Power Systems, Ltd., Yokohama (JP)

(72) Inventors: Yoshihiro Kuwamura, Tokyo (JP); Kazuyuki Matsumoto, Tokyo (JP)

(73) Assignee: MITSUBISHI POWER, LTD., Yokohama (JP)

(*) Notice: Subject to any disclaimer, the term of this patent is extended or adjusted under 35 U.S.C. 154(b) by 26 days.

(21) Appl. No.: 16/084,391

(22) PCT Filed: May 9, 2017

(86) PCT No.: PCT/JP2017/009556
§ 371 (c)(1),
(2) Date: Sep. 12, 2018

(87) PCT Pub. No.: WO2017/163911
PCT Pub. Date: Sep. 28, 2017

(65) Prior Publication Data
US 2019/0071991 A1 Mar. 7, 2019

(30) Foreign Application Priority Data

Mar. 25, 2016 (JP) .............................. JP2016-062347

(51) Int. Cl.
*F01D 11/08* (2006.01)
*F01D 5/02* (2006.01)
(Continued)

(52) U.S. Cl.
CPC ................ *F01D 11/08* (2013.01); *F01D 5/02* (2013.01); *F01D 9/02* (2013.01); *F01D 11/02* (2013.01);
(Continued)

(58) Field of Classification Search
CPC ... F01D 5/02; F01D 9/02; F01D 11/02; F01D 11/08; F01D 25/00; F02C 7/28;
(Continued)

(56) References Cited

U.S. PATENT DOCUMENTS 2,652,227 A * 9/1953 Karl ........................ F01D 5/041
415/64
4,662,820 A 5/1987 Sasada et al.
(Continued)

FOREIGN PATENT DOCUMENTS

JP        60081202 U * 6/1985
JP        S60-081202 U    6/1985
(Continued)

OTHER PUBLICATIONS

International Search Report dated dated May 23, 2017, issued in counterpart application No. PCT/JP2017/009556, with English translation. (4 pages).
(Continued)

*Primary Examiner* — Woody A Lee, Jr.
*Assistant Examiner* — Eric A Lange
(74) *Attorney, Agent, or Firm* — Westerman, Hattori, Daniels & Adrian, LLP

(57) ABSTRACT

A rotor machine includes a rotor which includes a recessed portion, a stator blade which includes a stator blade body and a shroud, and a fin. The recessed portion includes a recessed portion radial wall surface which extends in a radial direction, and the recessed portion radial wall surface includes a first wall surface which extends radially outward, a second wall surface which extends further radially outward than the first wall surface, and a protrusion surface which protrudes toward an upstream side in the axis direction from the first wall surface. The shroud includes a shroud radial wall surface facing a downstream side in the axis direction
(Continued)

of the recessed portion radial wall surface, and a shroud groove portion is formed in the shroud.

6 Claims, 13 Drawing Sheets

(51) Int. Cl.
    *F01D 11/02* (2006.01)
    *F01D 25/00* (2006.01)
    *F02C 7/28* (2006.01)
    *F01D 9/02* (2006.01)

(52) U.S. Cl.
    CPC ............... *F01D 25/00* (2013.01); *F02C 7/28* (2013.01); *F05D 2220/30* (2013.01); *F05D 2240/12* (2013.01); *F05D 2240/24* (2013.01); *F05D 2240/55* (2013.01)

(58) Field of Classification Search
    CPC ............. F05D 2220/30; F05D 2240/12; F05D 2240/24; F05D 2240/55
    See application file for complete search history.

(56) References Cited

U.S. PATENT DOCUMENTS

| | | | |
|---|---|---|---|
| 2005/0220610 A1 | 10/2005 | Ghasripoor et al. | |
| 2007/0224035 A1 | 9/2007 | Nigmatulin | |
| 2008/0056895 A1 | 3/2008 | Senoo | |
| 2011/0085892 A1* | 4/2011 | John | F01D 11/10 415/171.1 |
| 2013/0094945 A1* | 4/2013 | Kuwamura | F01D 5/225 415/173.1 |
| 2013/0149124 A1* | 6/2013 | Kuwamura | F01D 11/08 415/191 |
| 2014/0119901 A1* | 5/2014 | Shibata | F01D 11/08 415/173.1 |
| 2014/0314579 A1* | 10/2014 | Kuwamura | F01D 11/001 416/223 R |
| 2015/0132114 A1 | 5/2015 | Fukushima et al. | |
| 2016/0341058 A1 | 11/2016 | Nishikawa et al. | |

FOREIGN PATENT DOCUMENTS

| | | | | |
|---|---|---|---|---|
| JP | 61229903 A | * | 10/1986 | |
| JP | S61-229903 A | | 10/1986 | |
| JP | 08193501 A | * | 7/1996 | |
| JP | H08-193501 A | | 7/1996 | |
| JP | 2005-146977 A | | 6/2005 | |
| JP | 2005146977 A | * | 6/2005 | |
| JP | 2005-214051 A | | 8/2005 | |
| JP | 2005214051 A | * | 8/2005 | |
| JP | 2005-291205 A | | 10/2005 | |
| JP | 2006-138259 A | | 6/2006 | |
| JP | 2007-85340 A | | 4/2007 | |
| JP | 2008-057416 A | | 3/2008 | |
| JP | 2015-94220 A | | 5/2015 | |
| JP | 2015-140916 A | | 8/2015 | |

OTHER PUBLICATIONS

Written Opinion dated May 23, 2017, issued in counterpart application No. PCT/JP2017/009556, with English translation. (14 pages).

* cited by examiner

ROTARY MACHINE

TECHNICAL FIELD

The present invention relates to a rotary machine.

Priority is claimed on Japanese Patent Application No. 2016-062347, filed on Mar. 25, 2016, the content of which is incorporated herein by reference.

BACKGROUND ART

A turbo machine including a steam turbine or a gas turbine converts energy of a fluid sucked from an outside into a rotational motion of a rotor. Specifically, the steam turbine includes a rotor that rotates around an axis and a casing that covers the rotor from an outer peripheral side. A plurality of rotating blade rows (rotating blades) are provided on outer peripheral surface of the rotor, and a plurality of stator blade rows (stator blades) are provided on an inner peripheral surface of the casing. The rotating blade rows and the stator blade rows are arranged to alternate with each other in an axis direction. The fluid introduced into the casing alternately collides with the rotating blade rows and the stator blade rows so as to rotate the rotor.

Meanwhile, in the above-described steam turbine, in order to realize a smooth rotation of the rotor, a constant clearance is provided between a tip portion (shroud) of the stator blade and the outer peripheral surface of the rotor. However, steam flowing through the clearance flows to a downstream side without colliding with the rotating blades or the stator blades, and thus, the steam does not contribute to the rotational driving of the rotor. Accordingly, a technology for decreasing the flow (leakage) of the steam in the clearance as much as possible is required. As one example of the technology, a technology described in Patent Document 1 below is known. In a device described in Patent Document 1, a suppression plate protruding toward an upstream side is provided on a rotating blade hub facing a stator blade hub shroud in an axis direction.

CITATION LIST

Patent Literature

[Patent Document 1] Japanese Unexamined Patent Application, First Publication No. 2005-146977

SUMMARY OF INVENTION

Technical Problem

However, in a configuration described in Patent Document 1, a gap is framed between the suppression plate and the stator blade hub shroud, and thus, there is a possibility that a leakage of steam through a gap still occurs. In addition, the leakage is outward from a radially inner side of the rotor, and thus, is orthogonal to a main flow of the steam flowing in the axis direction. Accordingly, in a case where the main flow and the leakage steam perpendicularly collide with each other (or, in a case where the main flow and the leakage steam are mixed with each other), it is known that an energy loss referred to as a mixture loss occurs. An increase in the mixture loss may interfere with an efficiency improvement of the steam turbine. Therefore, a demand for a technology capable of reducing the mixture loss has been increased in recent years.

The present invention provides a rotary machine which reduces the mixture loss so as to, improve the efficiency of the steam turbine.

Solution to Problem

According to a first aspect of the present invention, there is provided a rotary machine including: a rotor which rotates around an axis and includes a recessed portion formed on an outer peripheral surface of the rotor; a stator blade which includes a stator blade body which extends inward from a radially, outer side of the axis and a shroud which is provided radially inside the stator blade body to be accommodated in the recessed portion; and a fin which protrudes from an inner peripheral surface facing a radially inner side of the shroud toward a bottom surface of the recessed portion, a clearance being formed between the bottom surface and the fin, in which the recessed portion includes a recessed portion radial wall surface, which extends in a radial direction, on an axially downstream side, the recessed portion radial wall surface includes a first wall surface which extends radially outward from the bottom surface, a second wall surface which extends further radially outward than the first wall surface, and a protrusion surface which protrudes toward an axially upstream side from the first wall surface between the first wall surface and the second wall surface, the shroud includes a shroud radial wall surface facing the recessed portion r dial wall surface, and the shroud includes a shroud groove portion which is connected to the inner peripheral surface of the shroud radially inward from a portion of the shroud radial wall surface radially outside a protrusion surface so as to retract from the shroud radial waft surface.

According to this configuration, the protrusion surface protruding toward the downstream side is formed between the first wall surface and the second well surface on the recessed portion radial wall surface. Accordingly vortexes having different swirl directions can be formed in a space surrounded by the shroud radial wall surface and the recessed portion radial wall surface in the axis direction. Particularly, in the space, a vortex which is formed in an area positioned on the radially outer side joins a rain flow flowing through a portion between the stator blade and the rotating blade without being orthogonal to the main flow. Accordingly, it is possible to reduce mixture loss in the steam turbine.

In addition, the shroud groove portion is formed in the shroud, and thus, it is possible to more smoothly guide a flow of the vortex. That is, a dissipation of the vortex is reduced, and it is possible to stably form the vortex.

According to a second aspect of the present invention, in the rotary machine, a surface of the shroud groove portion facing a downstream side may include an inclined surface which extends radially inward from the shroud radial wall surface toward an upstream side and a vertical surface which extends radially inward from a radially inner end edge of the inclined surface and is connected to an inner peripheral surface of the shroud.

According to this configuration, a downstream surface of the shroud groove portion is formed by the inclined surface and the Vertical surface. Both the inclined surface and the vertical surface are formed in a flat surface shape, and thus, compared to a case where a curved surface is machined, it is possible to more easily obtain the shroud groove portion.

According to a third aspect of the present invention, there is provided a rotary machine including: a rotor which rotates around an axis and includes a recessed portion formed on an outer peripheral surface of the rotor; a stator blade which includes a stator blade body which extends inward from a radially outer side of the axis and a shroud which is provided radially inside the stator blade body to be accommodated in the recessed portion; and a fin which protrudes from an inner surface facing a radially inner side of the shroud toward a bottom surface of the recessed portion, a clearance being, formed between the bottom surface and the fin, in which the recessed portion includes a recessed portion radial wall surface, which extends in a radial direction, on an axially downstream side, the recessed portion radial wall surface includes a first wall surface which extends radially outward from the bottom surface, a second wall surface which extends further radially outward than the first wall surface, and a protrusion surface which protrudes toward an axially upstream side from the first wall surface between the first wall surface and the second wall surface, the shroud includes a shroud radial wall surface facing the recessed radial wall surface, and the protrusion surface divides a space between the shroud radial wall surface and the recessed portion radial wall surface into a first space positioned radially inside the protrusion surface and a second space positioned radially outside the first space in a state where the protrusion surface is interposed the first space and the second space so as to form vortexes having different swirl directions in the first space and the second space.

According to this configuration, the protrusion surface protruding toward the downstream side is formed between the first wall surface and the second wall surface on the recessed portion radial wall surface. Accordingly the vortexes having different swirl directions can be formed in spaces (first space and second space) surrounded by the shroud radial wall surface and the recessed portion radial wall surface in the axis direction. Particularly, the vortex which is formed in the second space positioned on the radially outer side joins the main flow flowing through a portion between the stator blade and the rotating blade without being orthogonal to the main flow. Accordingly, it is possible to reduce mixture loss in the steam turbine.

According to a fourth aspect of the present invention, the rotary machine may further include a shroud protrusion portion which is provided on the shroud radial wall surface and protrudes toward the axially downstream side.

According to this configuration, the shroud protrusion portion is formed in the shroud, and thus, it is possible to more smoothly guide the flow of the vortex which is formed in the space surrounded by the shroud radial wall surface and the recessed portion radial wall surface in the axis direction. That is, the dissipation of the vortex is reduced, and thus, it is possible to stably form the vortex.

According to a fifth aspect of the present invention, in the rotary machine, a second wall surface groove portion, which is connected to the outer peripheral surface radially outward from it radially outer portion so as to retract from the second wall surface, ma be formed on the second wall surface.

According to this configuration, the second wall surface wove portion is formed, and thus, it is possible to more smoothly guide the flow of the vortex which is formed in the space surrounded by the shroud radial wall surface and the recessed portion radial wall surface in the axis direction. That is, the dissipation of the vortex is reduced, and thus, it is possible to stably form the vortex.

According to a sixth aspect of the present invention, in the rotary machine, the first wall surface and the second wall surface are provided at the same position in the axis direction, a protrusion portion protruding toward the axially upstream side may be formed between the first wall surface and the second wall surface, and the protrusion surface may be formed a radially inner surface of the protrusion portion.

According to this configuration, the protrusion portion (protrusion surface) protruding toward the downstream side is formed between the first wall surface and the second wall surface on the recessed portion radial wall surface. Accordingly, the vortexes having different swirl directions can be formed in the spaces (first space and second space) surrounded by the shroud radial wall surface and the recessed portion radial wall surface in the axis direction. Particularly, the vortex which is formed in the second space positioned on the radially outer side joins the main flow flowing through a portion between the stator blade and the rotating blade without being orthogonal to the main flow.

Accordingly, it is possible to reduce the mixture loss in the steam turbine.

According to a seventh aspect of the present invention, in the rotary machine, the first wall surface may be provided on a downstream side of the second wall surface in the axis direction, and the protrusion surface may connect a radially outer end portion of the first wall surface and a radially inner wall end portion of the second wall surface to each other.

According to this configuration, the vortex can be sufficiently captured in a region surrounded by the bottom surface, the second wall surface, and the protrusion surface, and thus, it is possible to more smoothly guide the vortex. That is, the dissipation of the vortex is reduced, and thus, it is possible to stably form the vortex.

Advantageous Effects of Invention

According to the rotary machine, it is possible to reduce a mixture loss to improve the efficiency of a steam turbine.

BRIEF DESCRIPTION OF DRAWINGS

FIG. 6 is an enlarged view of a main portion of a steam turbine according to a fifth embodiment of the present invent on.

DESCRIPTION OF EMBODIMENTS

First Embodiment

Figure 1:
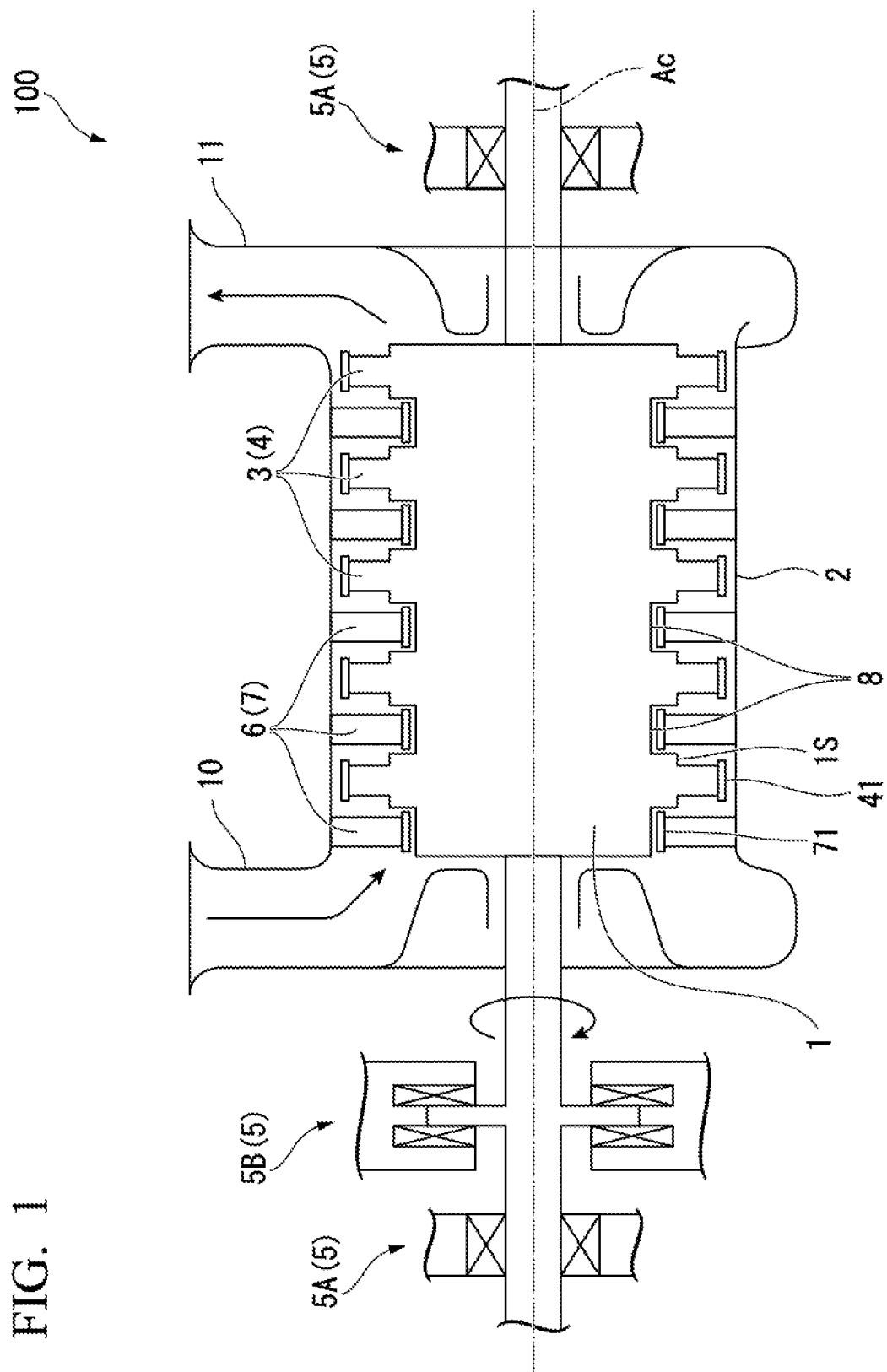
FIG. 1 is a schematic view showing a configuration of a steam turbine according to an embodiment of the present invention.
Figure 2:
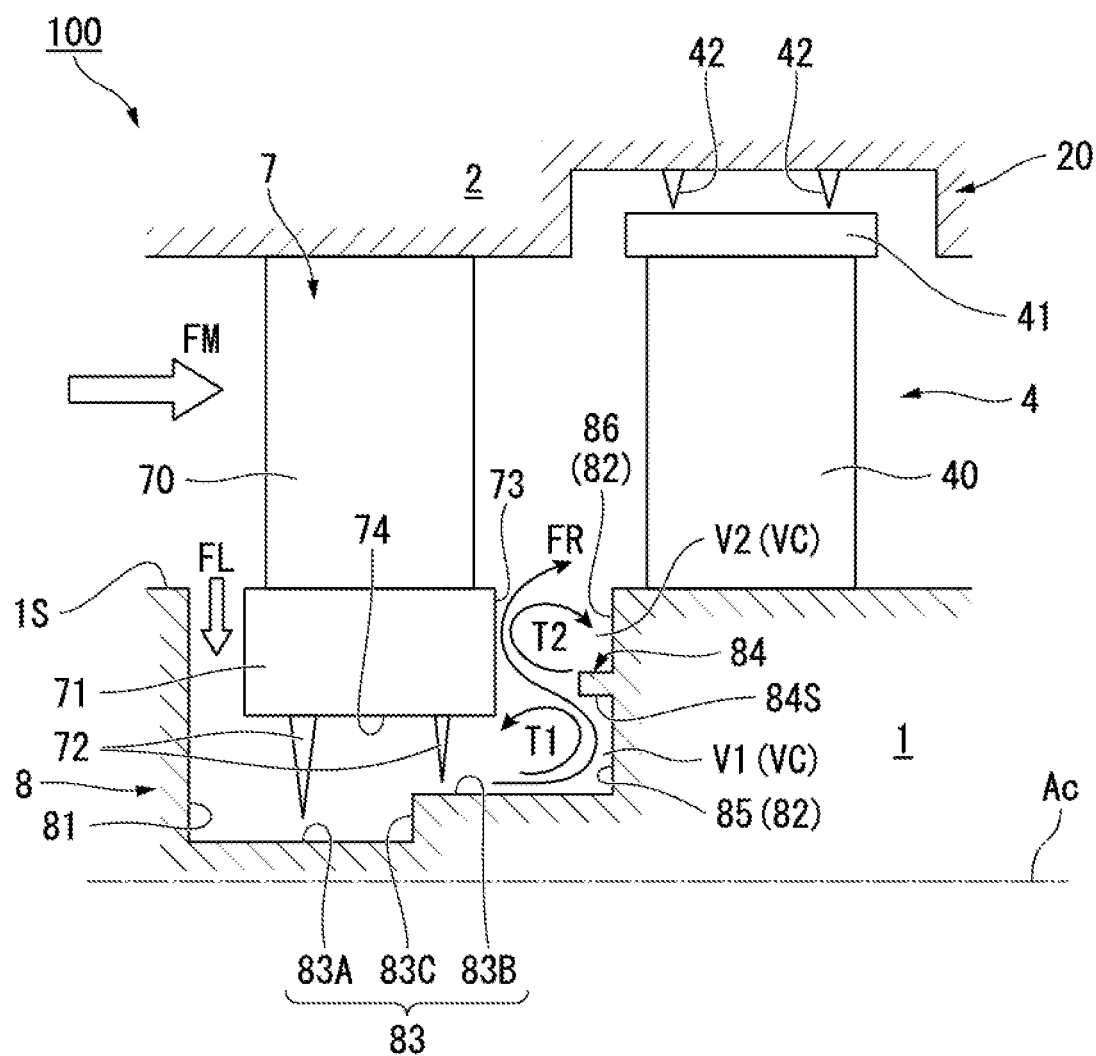
FIG. 2 is an enlarged view of a main portion (If a steam turbine according to a first embodiment of the present invention.

A first embodiment of the present invention will be described with reference to FIGS. 1 and 2. As shown in FIG. 1, a steam turbine 100 (rotary machine) according to the present embodiment includes a rotor 1 which rotates around an axis Ac and a casing 2 which covers the rotor 1 from an outer peripheral side.

The rotor 1 is formed in a columnar shape about the axis Ac. A plurality of rotating blade rows 3, which are arranged from one side (first side) in an axis Ac direction toward the other side (second side), are provided on an outer peripheral surface is of the rotor 1.

Each rotating blade row 3 includes a plurality of rotating blades 4 which are arranged on the outer peripheral surface 1S of the rotor 1 at intervals in a circumferential direction of the axis Ac. Although it is not shown in detail, the rotating blade 4 has a cross section of an airfoil when viewed in a radial direction of the axis Ac.

Bearing devices 5 are provided on both end portions of the rotor 1 in the axis Ac direction. The rotor 1 is rotatably supported around the axis Ac by the bearing devices 5. Specifically, the bearing devices 5 include journal bearings 5A respectively provided on both sides of the rotor 1 in the axis Ac direction and a thrust bearing 5B which is provided on only the one side (first side) in the axis Ac direction. The journal bearings 5A support a radial load of the rotor 1. The thrust bearing 5B supports a load in the axis Ac direction of the rotor 1.

The casing 2 is formed in a tubular shape about the axis Ac. A plurality of stator blade rows 6, which are arranged from the one side (first side) in the axis Ac direction toward the other side (second side), are provided on an inner peripheral surface of the casing 2. Each stator blade row 6 includes a plurality of stator blades 7 which are arranged on the inner peripheral surface of the casing 2 at intervals in the circumferential direction of the axis Ac. Similar to the rotating blade 4, the stator blade 7 has a cross section of an airfoil when viewed in the radial direction of the axis Ac.

In the rotor 1, a recessed portion 8 having an angular groove shape which is recessed radially inward from the outer peripheral surface 1S of the rotor 1 is formed in a region between a pair of rotating blade rows 3 adjacent to each other. A stator blade shroud 71 (shroud) described later is provided in a portion including a tip portion (radially inner end portion) of each stator blade 7. The stator blade shroud 71 is accommodated in the recessed portion 8 on the rotor 1.

In addition, a suction port 10 through which steam is sucked from the outside is formed on the one side (first side) in the axis Ac direction of the casing 2, and an exhaust port 11 through which the steam which has passed through the inside of the casing 2 is exhausted is formed on the other side (second side) in the axis Ac direction. In the following descriptions, a side on which the suction port 10 is positioned when viewed from the exhaust port 11 is referred to as an upstream side, and a side on which the exhaust port 11 is positioned when viewed from the suction port 10 is referred to as a downstream side.

Next, detailed configurations of the rotating blade 4 and the stator blade 7 will be described with reference to FIG. 2. As shown in FIG. 2, the rotating blade 4 includes a rotating blade body 40 which extends radially outward from the outer peripheral surface 1S of the rotor 1 and a rotating blade shroud 41 which is attached to a radially outer end portion of the rotating blade body 40. A dimension of the rotating blade shroud 41 in the axis Ac direction is set to be larger than a dimension of the rotating blade 4 in the axis Ac direction. A rotating blade accommodation portion 20 for accommodating the rotating blade shroud 41 is formed in a region facing the rotating blade shroud 41 on an inner peripheral side of the casing 2. The rotating blade accommodation portion 20 has an angular groove shape which is recessed radially outward from an inner peripheral surface 74 of the casing 2. A plurality of (two) rotating blade-side fins 42 are provided on a radially outer surface of the rotating blade accommodation portion 20. Each of the fins has a thin plate shape which extends radially inward from the radially outer surface of the rotating blade accommodation portion 20. A gap (clearance) spreading in the radial direction is formed between a tip portion of the rotating blade-side fin 42 and the rotating blade accommodation portion 20.

The stator blade 7 includes a stator blade body 70 which extends radially inward from the inner peripheral surface 74 of the casing 2 and a stator blade shroud 71 which is attached to a radially outer end portion of the stator blade body 70. In the present embodiment, radial dimensions of the stator blade 7 and the rotating blade 4 are the same as each other. In other words, when viewed in the axis Ac direction, the stator blade 7 and the rotating blade 4 are arranged to overlap each other. A dimension of the stator blade shroud 71 in the axis Ac direction is set to be larger than the dimension of the stator blade 7 in the axis Ac direction. A plurality of (two) stator blade-side fins 72 are provided on a radially inner surface of the stator blade shroud 71. Each of the stator blade-side fins 72 has a thin plate shape which extends radially inward from the stator blade shroud 71. The stator blade shroud 71 and the stator blade-side fins 72 are provided to reduce a leakage of the steam between the rotor 1 and the stator blade 7. The stator blade shroud 71 and the stator blade-side fins 72 are accommodated in a recessed portion 8 which is formed on the outer peripheral surface 1S of the rotor 1.

The recessed portion 8 is recessed radially inward from the outer peripheral surface 1S of the rotor 1. Among respective surfaces forming the recessed portion 8, a surface positioned on the upstream side is an upstream surface 81 which spreads in the radial direction. A surface facing the upstream surface 81 from the downstream side is a downstream surface 82 (recessed portion radial wall surface) spreading in the radial direction. In addition, a bottom surface 83 spreading along the axis Ac is formed between the upstream surface 81 and the downstream surface 82. The bottom surface 83 includes a first bottom surface 83A, a second bottom surface 83B, and a step portion 83C.

The first bottom surface 83A is positioned radially inside the second bottom surface 83B. The step portion 83C radially connects the first bottom surface 83A and the second bottom surface 83B to each other. In the above-described two stator blade-side fins 72, the stator blade-side fin 72 positioned on the upstream side faces the first bottom surface 83A, and the stator blade-side fin 72 positioned on the downstream side faces the second bottom surface 83B. A gap (clearance) spreading in the radial direction is formed between the stator blade-side fins 72 and the bottom surface 83 (first bottom surface 83A and second bottom surface 83B).

A protrusion portion 84 protruding toward the upstream side is provided on the downstream surface 82 in the recessed portion 8. The protrusion portion 84 is provided in a region corresponding to a surface (shroud radial wall surface 73) of the stator blade shroud 71 facing the downstream side in the radial direction of the axis Ac. In other words, the protrusion portion 84 is positioned radially outside a surface (inner peripheral surface 74) of the stator blade shroud 71 facing the radially inner side. More specifically, the protrusion portion 84 has a rectangular shape in a cross sectional view including the axis Ac. Among respective surfaces forming the protrusion portion 84, a surface facing the radially inner side is a protrusion surface 84S.

The above-described protrusion portion 84 is provided, and thus, the downstream surface 82 of the recessed portion 8 is partitioned into two regions in the radial direction. In the downstream surface 82, a region (first region) radially inside the protrusion portion 84 (protrusion surface 84S) is a first wall surface 85 which extends radially outward from the bottom surface 83 (second bottom surface 83B). A region (second region) radially outside the protrusion portion 84 (protrusion surface 84S) is a second wall surface 86 which extends further radially outward than the first wall surface 85. Radial dimensions of the first wall surface 85 and the second wall surface 86 have the same radial dimension as each other. That is, the downstream surface 82 of the recessed portion 8 is equally divided in the radial direction by the protrusion portion 84. In addition, positions of the first wall surface 85 and the second wall surface 86 in the axis Ac direction are the same as each other.

A space (convection space VC) which spreads in the axis Ac direction and in the radial direction is formed between the downstream surface 82 and the shroud radial wall surface 73. The convection space VC includes a first space V1 spreading radially inward and a second space V2 spreading radially outward, based on a radial position at which the protrusion portion 84 is positioned. In addition, a protrusion dimension (a dimension of the protrusion surface 84S in the axis Ac direction) of the protrusion portion 84 is set to be sufficiently smaller than the dimension of the second bottom surface 83B in the axis Ac direction.

An operation of the steam turbine 100 configured as described above will described with reference to FIG. 1.

When the steam turbine 100 is operated, first, a high-temperature and high-pressure steam supplied from a steam supply source (not shown) such as a boiler is introduced to the inside of the casing 2 through the suction port 10.

The steam introduced into the casing 2 sequentially collides with the rotating blades 4 (rotating blade rows 3) and the stator blades 7 (stator blade rows 6). Accordingly, the rotor 1 obtains rotational energy, and thus, rotates around the axis Ac.

The rotational lotion of the rotor 1 is extracted by a generator (not shown) connected to a shaft end.

The above-described cycle is continuously repeated.

Next, a behavior of the steam around the rotating blade 4 and the stator blade 7 will be described with reference to FIG. 2. As shown in FIG. 2, the steam flowing from the upstream side flows toward the downstream side via the stator blade 7 and the rotating blade 4, and thus, a main flow FM is formed. As described above, the main flow FM sequentially collides with the stator blade 7 and the rotating blade 4, and thus, the main flow FM is rectified, and energy is applied to the rotating blade 4.

Meanwhile, in the steam flowing from the upstream side, a component except for the main flow FM flows toward the inside of the recessed portion 8, and thus, a leakage flow FL is formed. Most of the leakage flow FL is blocked by the fins provided on the stator blade shroud 71. However, the clearance is formed between the fins and the bottom surface 83 of the recessed portion 8, and thus, a component of a portion of the leakage flow FL flows toward the convection space VC on the downstream side through the clearance to form a return flow FR in the convection space VC.

Here, in a case where the protrusion portion 84 is not provided on the downstream surface 82 of the recessed portion 8, the return flow FR which has flowed into the convection space VC flows toward the outside from the radially inner side along the downstream surface 82 and the shroud radial wall surface 73. In this case, the main flow FM flows in an upstream-downstream direction above the convection space VC. That is, the return flow FR and the main flow FM collides with each other in a direction orthogonal to each other. In this way, in a case where the main flow FM and the return flow FR perpendicularly collide with each other (or, in a case where the main flow FM and the return flow FR are mixed with each other), it is known that an energy loss referred to as a mixture loss occurs.

However, in the steam turbine 100 according to the present embodiment, the protrusion portion 84 is formed on the downstream surface 82 of the recessed portion 8, and thus, it is possible to change a behavior of the return flow FR in the convection space VC. More specifically as shown in FIG. 2, the return flow FR which has flowed into the convection space VC (first space V1) flows radially outward along the downstream surface 82 (first wall surface 85), and thereafter, collides with the protrusion surface 84S of the protrusion portion 84. A direction of the return flow FR which has collided with the protrusion surface 84S is changed along the protrusion surface 84S, and flows from the upstream side toward the downstream side. Next, a component of a portion of the return flow FR collides with the shroud radial wall surface 73 of the stator blade shroud 71, a direction of the component is changed again, and thus, the component flows inward from the radially outer side. That is, the protrusion portion 84 is provided, and thus, the return flow FR forms a vortex (first vortex T1) in the first space V1. The first vortex T1 flows from the upstream side toward the downstream side on the bottom surface 83 side in the first space V1. Meanwhile, the first vortex T1 flows from the downstream side toward the upstream side on the protrusion portion 84 side in the first space V1.

In addition, in the first vortex T1, a component of a portion which collides with the shroud radial wall surface 73 deviates from the first vortex T1 and flows radially outward. That is, a portion of the first vortex T1 flows toward the second space V2. Accordingly, similar to the first vortex T1, a vortex (second vortex T2) is formed in the second space V2. A swirl direction of the second vortex T2 is different from a swirl direction of the first vortex T1. More specifically, the second vortex T2 flows from the downstream side toward the upstream side on the protrusion portion 84 side in the second space V2. Meanwhile, the second vortex T2 flows from the upstream side toward the downstream side on the main flow FM side in the second space V2. That is, the second vortex T2 and the main flow FM flow in an approximately the same direction as each other on a radially outer side (a side which is in contact with the main flow FM) of the second space V2. Meanwhile, the return flow FR which has left the convection space VC can join the main flow FM without being orthogonal to the main flow FM.

As described above, in the steam turbine 100 according to the present embodiment, the protrusion surface 84S (protrusion portion 84) protruding toward the downstream side is formed between the first wall surface 85 and the second wall surface 86 on the downstream surface 82. Accordingly, the vortexes having different swirl directions can be formed in the spaces (first space V1 and second space V2) surrounded by the shroud radial wall surface 73 and the downstream surface 82 in the axis Ac direction. Particularly the vortex which is formed in the second space V2 positioned on the radially outer side joins the main flow FM flowing through a portion between the stator blade 7 and the rotating blade 4 without being orthogonal to the main flow FM. Accordingly, it is possible to reduce mixture loss in the steam turbine 100.

Second Embodiment

Figure 3:
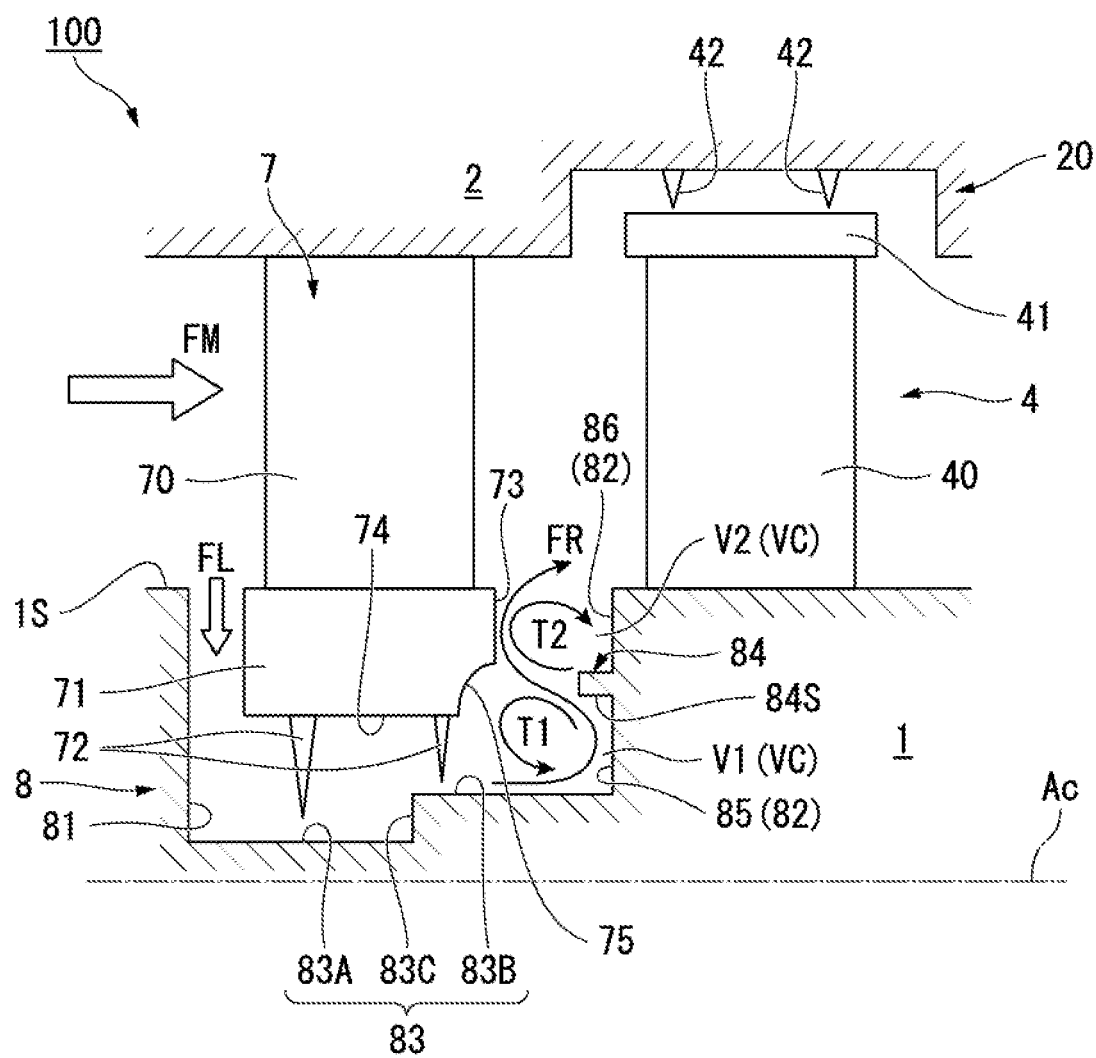
FIG. 3 is an enlarged view of a main portion of a steam turbine according to a second embodiment of the present invention.

Next, a second embodiment of the present be described with reference to FIG. 3. In addition, the same reference numerals are assigned to the same configurations as those of the first embodiment, end detailed descriptions thereof are omitted. As shown in FIG. 3, in the steam turbine 100 according to the present embodiment, the protrusion portion 84 is provided on the downstream surface 82, and shroud groove portion 75 is formed on the stator blade shroud 71.

The shroud groove portion 75 is formed corner formed between the shroud radial wall surface 73 and the inner peripheral surface 4 of the stator blade shroud 71. That is, the shroud groove portion 75 is formed by a curved surface which extends to retract from the shroud radial wall surface d the upstream side and gradually extends radially inward toward the upstream side. An upstream end portion of the curved surface forming the shroud groove portion 75 is connected to a downstream end portion of the inner peripheral surface 74.

Moreover, a downstream end portion of the curved surface is positioned radially outside the protrusion portion 84 (protrusion surface 84S). That is, the protrusion portion 84 faces the curved surface of the shroud groove portion from the downstream side.

According to this configuration, the protrusion portion 84 is provided on the downstream surface 82, and thus, two vortexes (first vortex T1 and second vortex T2) having different swirl directions can, be formed in the convection space VC (first space V1 and second space V2). In addition, the first vortex T1 formed in the first space V1 is captured by the shroud groove portion 75 when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced.

Third Embodiment

Figure 4:
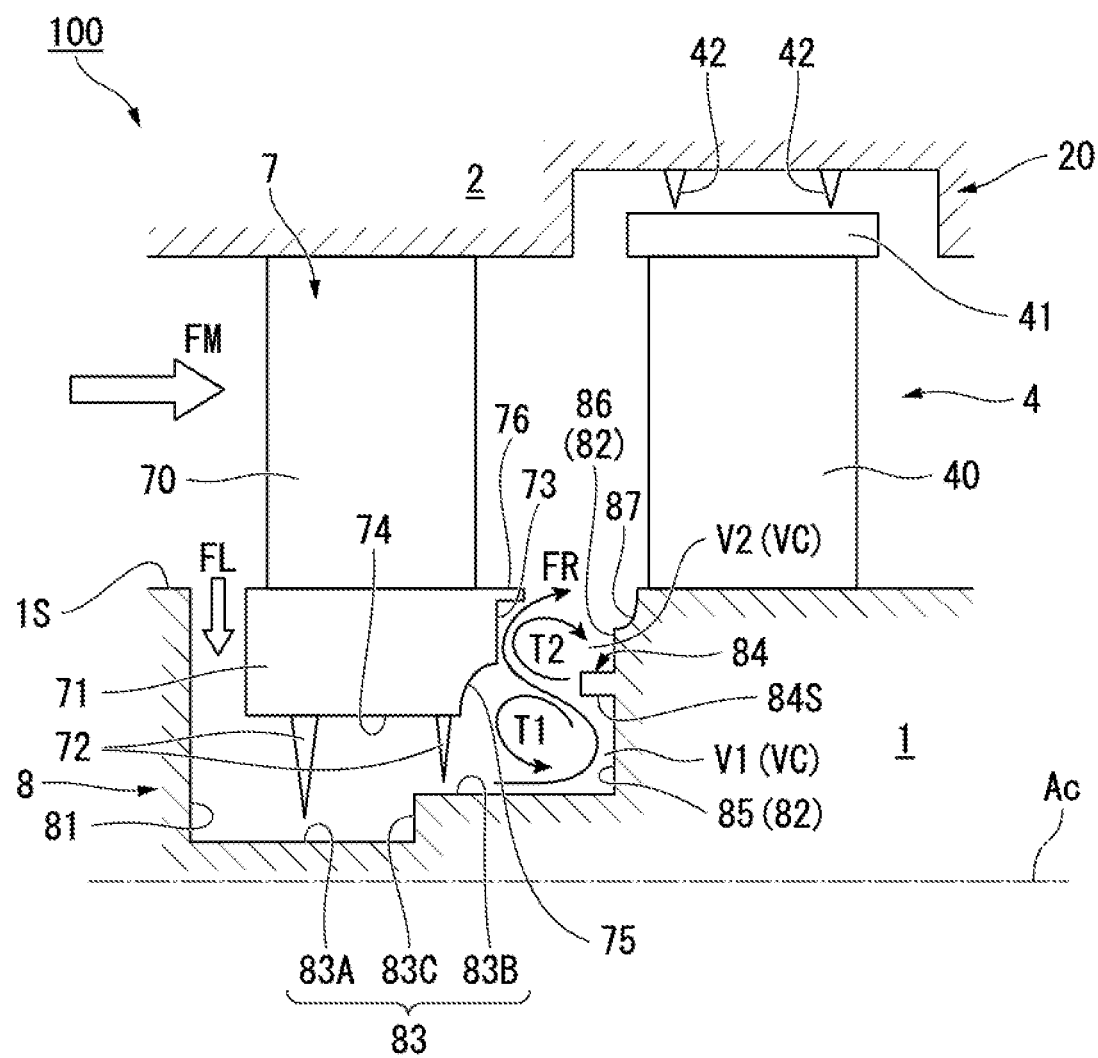
FIG. 4 is an enlarged view of a main portion of a steam turbine according to a third embodiment of the present invention.

Next, a third embodiment of the present invention will be described with reference to FIG. 4. In addition, the same reference numerals are assigned to the same configurations as those of the above-described embodiments, and detailed descriptions thereof are omitted. As shown in FIG. 4, in the steam turbine 100 according to the present embodiment, in addition to the protrusion portion 84 and the shroud groove portion 75 described in the second embodiment, a shroud protrusion portion 76 and a second wall surface groove portion 87 are formed.

The shroud protrusion portion 76 is provided in a portion including a radially outer end portion of the shroud radial wall surface 73 of the above-described stator blade shroud 71. The shroud protrusion portion 76 protrudes toward the downstream side from the shroud radial wall surface 73. The shroud protrusion portion 76 has a rectangular shape in a cross sectional view including the axis Ac. A surface of the stator blade shroud 71 facing radially outward and a surface of the shroud-side protrusion portion 84 facing radially outward are continuous in the axis Ac direction. Meanwhile, a surface of the shroud protrusion portion 76 facing radially inward is orthogonal to the shroud radial wall surface 73. In addition, a dimension of the shroud protrusion portion 76 in the axis Ac direction is sufficiently smaller than a dimension of the second bottom surface 83B in the axis Ac direction.

In addition, a downstream end portion of the shroud protrusion portion 76 is positioned on upstream side of an upstream end portion of the protrusion portion 84 provided on the downstream surface 82. That is, when viewed in the radial direction, a gap is formed between the downstream end portion of the shroud protrusion portion 76 and the upstream end portion of the protrusion portion 84 provided on the downstream surface 82.

The second wall surface wove portion 87 is formed on a portion on the second wall surface 86 radially outside the protrusion portion 84. More specifically, the second wall surface wove portion 87 is formed at a coiner between the outer peripheral surface 1S of the rotor 1 and the second wall surface 86. That is, the second wall surface groove portion 87 is formed by a curved surface which extends to retract from the second wall surface 86 toward the downstream side and gradually extends radially outward toward the downstream side. A downstream end portion of the curved surface forming the second wall surface grove portion 87 is connected to the outer peripheral surface 1S of the rotor 1. In addition, a dimension of the second wall surface groove portion 87 in the radial direction of the axis Ac is sufficiently larger than a dimension (thickness) of the shroud protrusion portion 76 in the radial direction.

According to this configuration, in the second vortex T2 formed in the second space V2, a component outward from the radially inner side is guided by the shroud protrusion portion 76, a direction of the component is changed, and thus, the component flows from the upstream side toward the downstream side. In other words, the shroud protrusion portion 76 is provided, and thus, a possibility of a component of the second vortex T2 outward from the radially inner side colliding with the main flow FM in a direction orthogonal to the main flow FM can be reduced. In addition, the second wall surface groove portion 87 is formed, and thus, the second vortex T2 can be more sufficiently captured in the second space V2. Specifically, the second vortex T2 flows along the curved surface of the second wall surface groove portion 87, and thus, a direction of the second vortex T2 is gradually changed from the downstream side to the upstream side inward from the radially outer side, and the second vortex T2 can stably swirl in the second space V2.

As described above, the vortexes having different swirl directions can be formed in the spaces (first space V1 and second space V2) surrounded by the shroud radial wall surface 73 and the downstream surface 82 in the axis Ac direction. Particularly, the shroud protrusion portion 76 is provided, and thus, the second vortex T2 which is formed in the second space V2 positioned on the radially outer side joins the main flow FM flowing through the portion between the stator blade 7 and the rotating blade 4 without being orthogonal to the main flow FM. In addition, the second wall surface groove portion 87 is formed, and thus, the flow of the second vortex T2 can be more smoothly guided. That is, a dissipation of the vortex is reduced, and it is possible to stably form the vortex. Accordingly, it is possible to reduce the mixture loss in the steam turbine 100.

Fourth Embodiment

Figure 5:
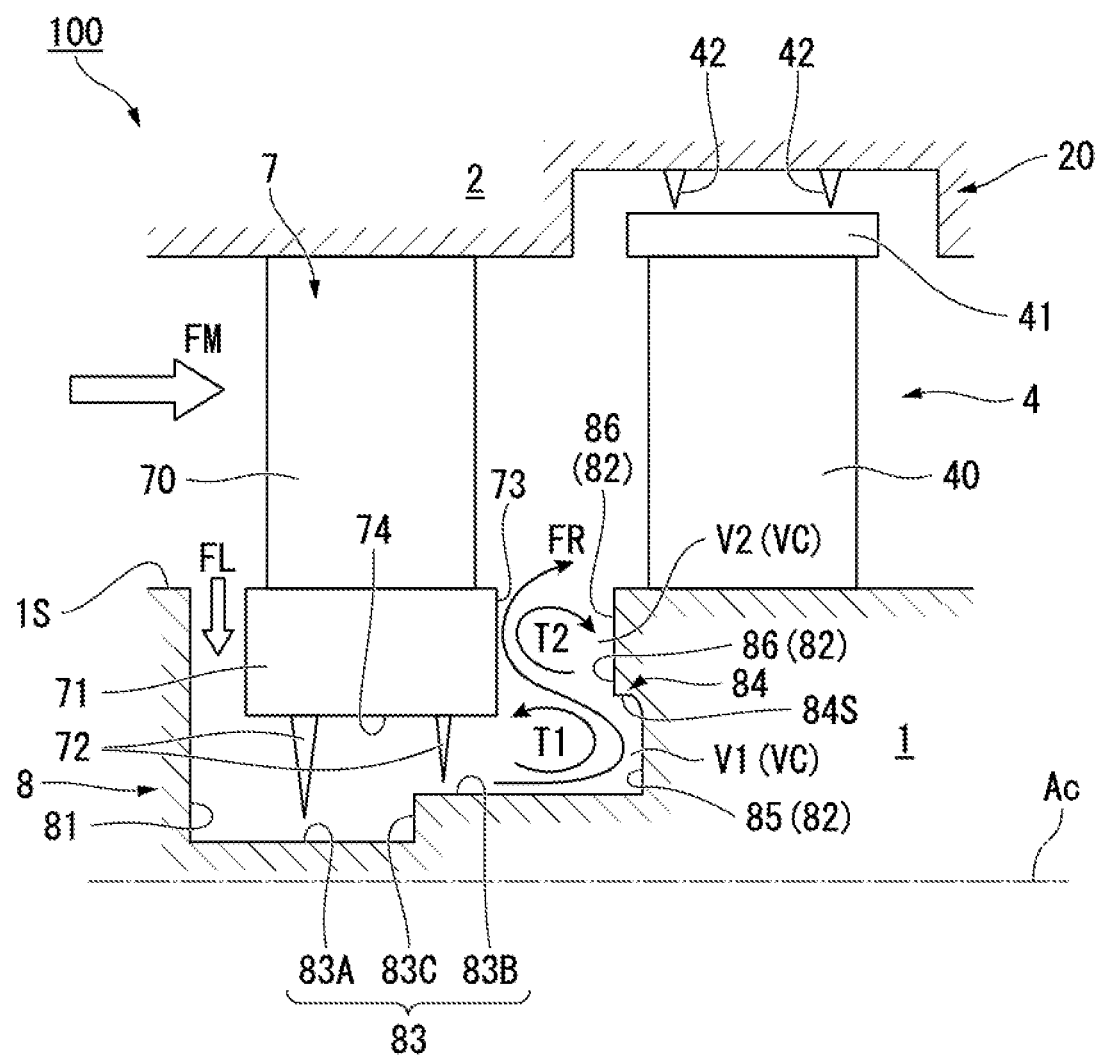
FIG. 5 is an enlarged view of a main portion of a steam turbine according to a fourth embodiment of the present invention.

Subsequently, a fourth embodiment of the present invention will be described with reference to FIG. 5. In addition, the same reference numerals are assigned to the same configurations as those of the above-described embodiments, and detailed descriptions thereof are omitted. As shown in FIG. 5, in the steam turbine 100 according to the present embodiment, the above-described protrusion portion 84 or the like is not formed on the shroud radial wall surface 73, and a shape of the downstream surface 82 is different from those of the above-described embodiments.

In the present embodiment, the positions of the first wall surface 85 and the second wall surface 86 on the downstream surface 82 in the axis Ac direction are different from each other. Specifically, the first wall surface 85 is positioned on the downstream side of the second wall surface 86 in the axis Ac direction. In addition, a radially outer end portion of the first wall surface 85 and a radially inner end portion of the second wall surface 86 are connected to each other by the protrusion surface 84S. The protrusion surface 84S extends along the axis Ac. In addition, a downstream end portion of the protrusion surface 84S and the radially outer end portion of the first wall surface 85 are connected to each other in a curved shape.

The first wall surface 85 and the second wall surface 86 have the same radial dimension as each other. That is, the downstream surface 82 is equally divided radially by the protrusion surface 84S. In addition, a space (convection space VC) which spreads in the axis Ac direction and the radial direction is formed between the downstream surface 82 and the shroud radial wall surface 73. The convection space VC includes the first space V1 spreading radially inward and the second space V2 spreading radially outward, based on a radial position at which the protrusion surface 84S is positioned.

According to this configuration, first, steam which has flowed into the first space V1 flows from the upstream side toward the downstream side along the second bottom surface 83B. Next, the steam flows outward from the radially inner side along the first wall surface 85, and thereafter, is guided by the protrusion surface 84S such that the direction of the steam is changed and flows from the downstream side toward the upstream side. Accordingly similar to the first embodiment, the vortex (first vortex T1 is formed in the first space V1. In addition, the vortex (second vortex T2) having the swirl direction different from that of the first vortex T1 is formed in the second space V2.

In this way, the vortexes having different swirl directions can be formed in the spaces (first space V1 and second space V2) surrounded by the shroud radial wall surface 73 and the downstream surface 82 in the axis Ac direction. Particularly, the second vortex 12 which is formed in the second space V2 positioned on the radially outer side joins the main flow FM flowing through the portion between the stator blade 7 and the rotating blade 4 without being orthogonal to the main flow FM. Accordingly, it is possible to reduce the mixture loss in the steam turbine 100.

Fifth Embodiment

Figure 6:
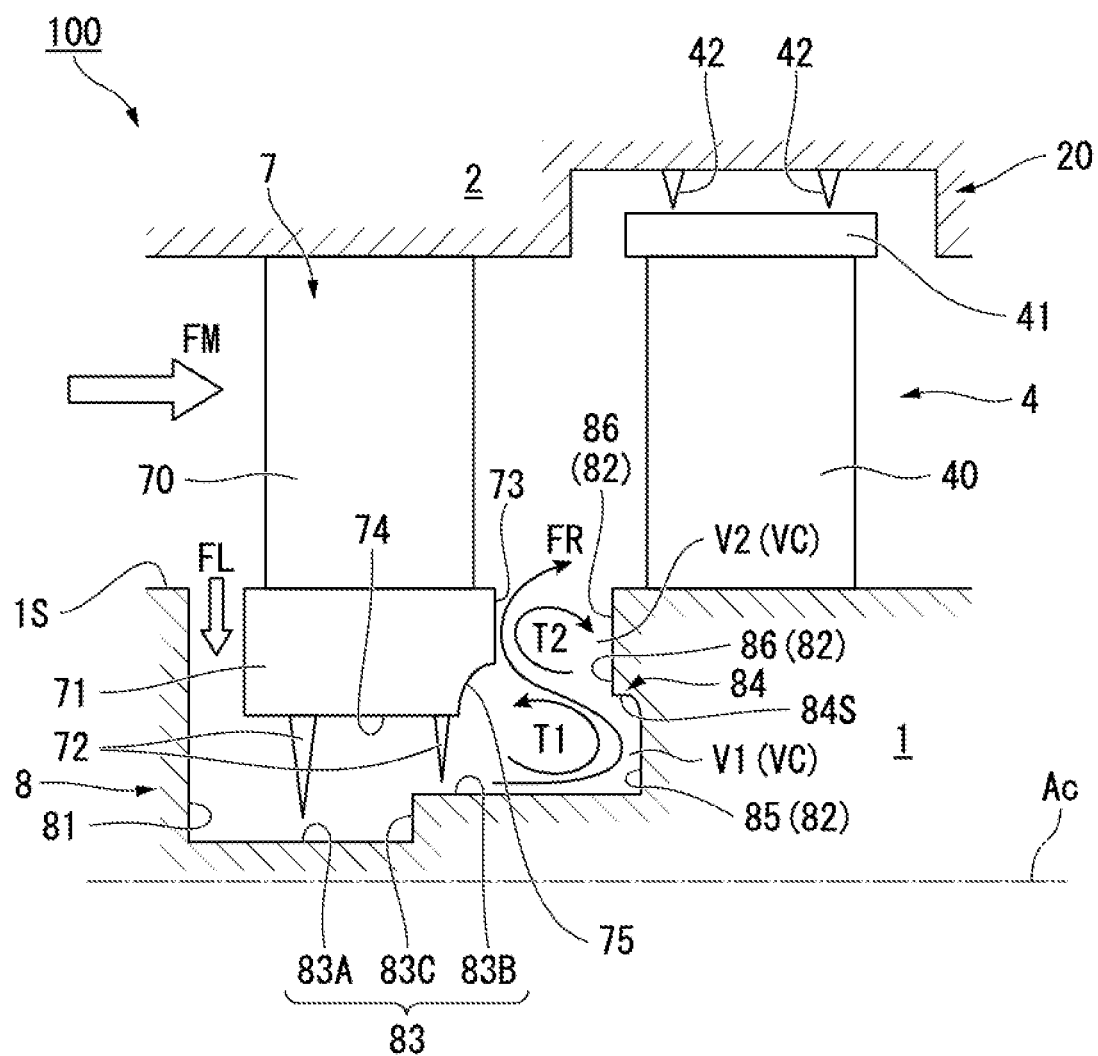

Subsequently, a fifth embodiment of the present invention will be described with reference to FIG. 6. In addition, the same reference numerals are assigned to the same configurations as those of the above-described embodiments, and detailed descriptions thereof are omitted. As shown in FIG. 6, in the steam turbine 100 according to the present embodiment, in addition to having the downstream surface 82 configured similar to that of the fourth embodiment, the shroud groove portion 75 described in the second embodiment is formed in the stator blade shroud 71. The radially outer end portion of the shroud groove portion 75 is positioned radially outside the radially outer end portion of the protrusion surface 84S.

According to this configuration, the two vortexes (first vortex T1 and second vortex T2) having different swirl directions can be formed in the convection space VC (first space V1 and second space V2). In addition, the first vortex T1 formed in the first space V1 is captured by the shroud groove portion 75 and the protrusion surface 84S when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced.

Sixth Embodiment

Figure 7:
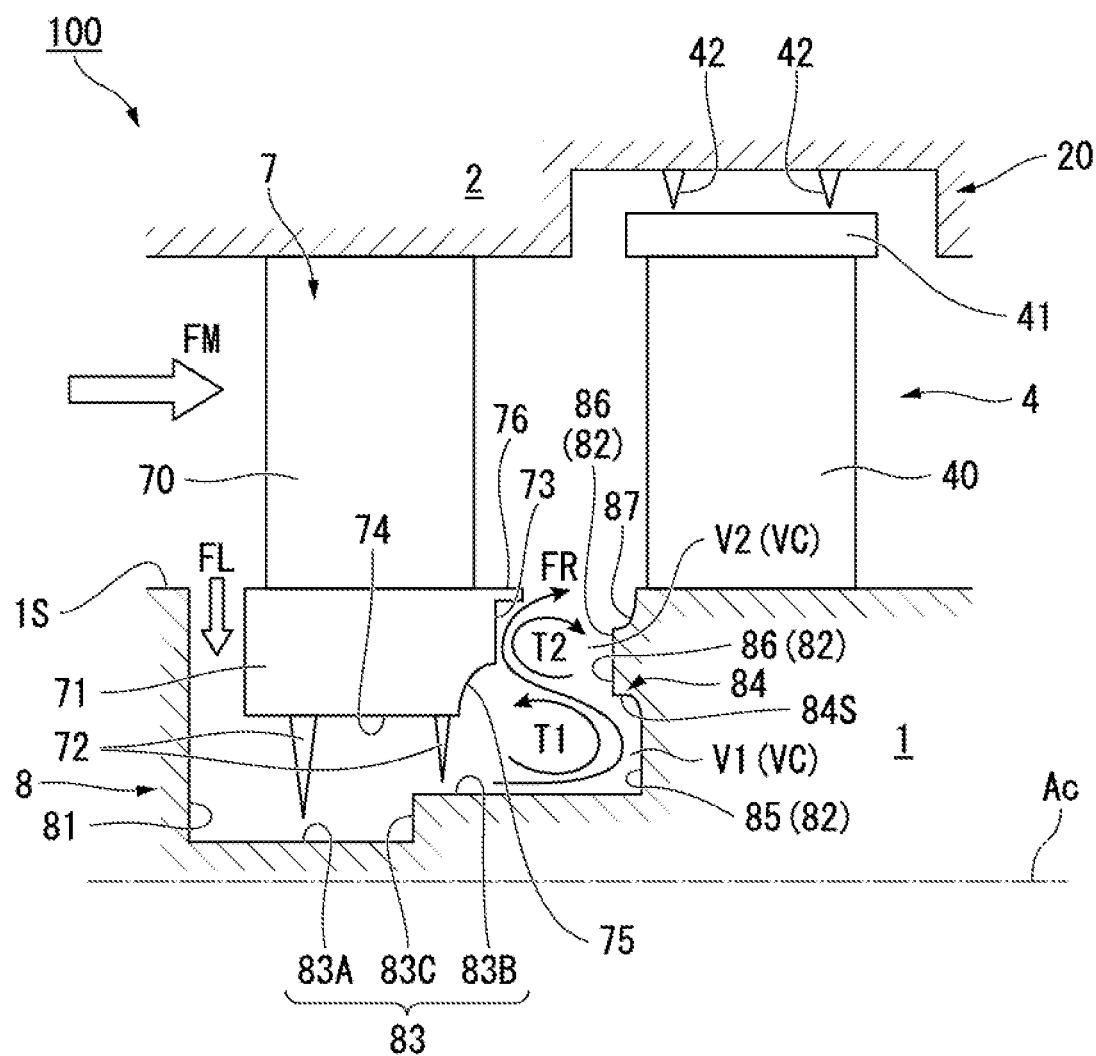
FIG. 7 is an enlarged view of a main portion of a steam turbine according to a sixth embodiment of the present invention.

Subsequently, a sixth embodiment of the present invention will be described with reference to FIG. 7. In addition, the same reference numerals are assigned to, the same configurations as those of the above-described embodiments, and detailed descriptions thereof are omitted. As shown in FIG. 7, in the steam turbine 100 according to the present embodiment, in addition to the shroud groove portion 75 and the protrusion surface 84S described in the fifth embodiment, the shroud protrusion portion 76 and the second wall surface groove portion 87 described in the third embodiment are formed.

According to this configuration, the vortexes having different swirl directions can be formed in the spaces (first space V1, and second space V2) surrounded by the shroud radial wall surface 73 and the downstream surface 82 in the axis Ac direction. Particularly, the shroud protrusion portion 76 is provided, and thus, the second vortex T2 which is formed in the second space V2 positioned on the radially outer side joins the main flow FM flowing through the portion between the stator blade 7 and the rotating blade 4 without being orthogonal to the main flow FM. In addition, the second wall surface groove portion 87 is formed, and thus, the flow of the second vortex T2 CM can be more smoothly guided. That is, a dissipation of the vortex is reduced, and it is possible to stably form the vortex. Accordingly, it is possible to reduce the mixture loss in the steam turbine 100.

In addition, the first vortex T1 formed in the first space V1 is captured by the shroud groove portion 75 and the protrusion surface 84S when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced.

Seventh Embodiment

Figure 8:
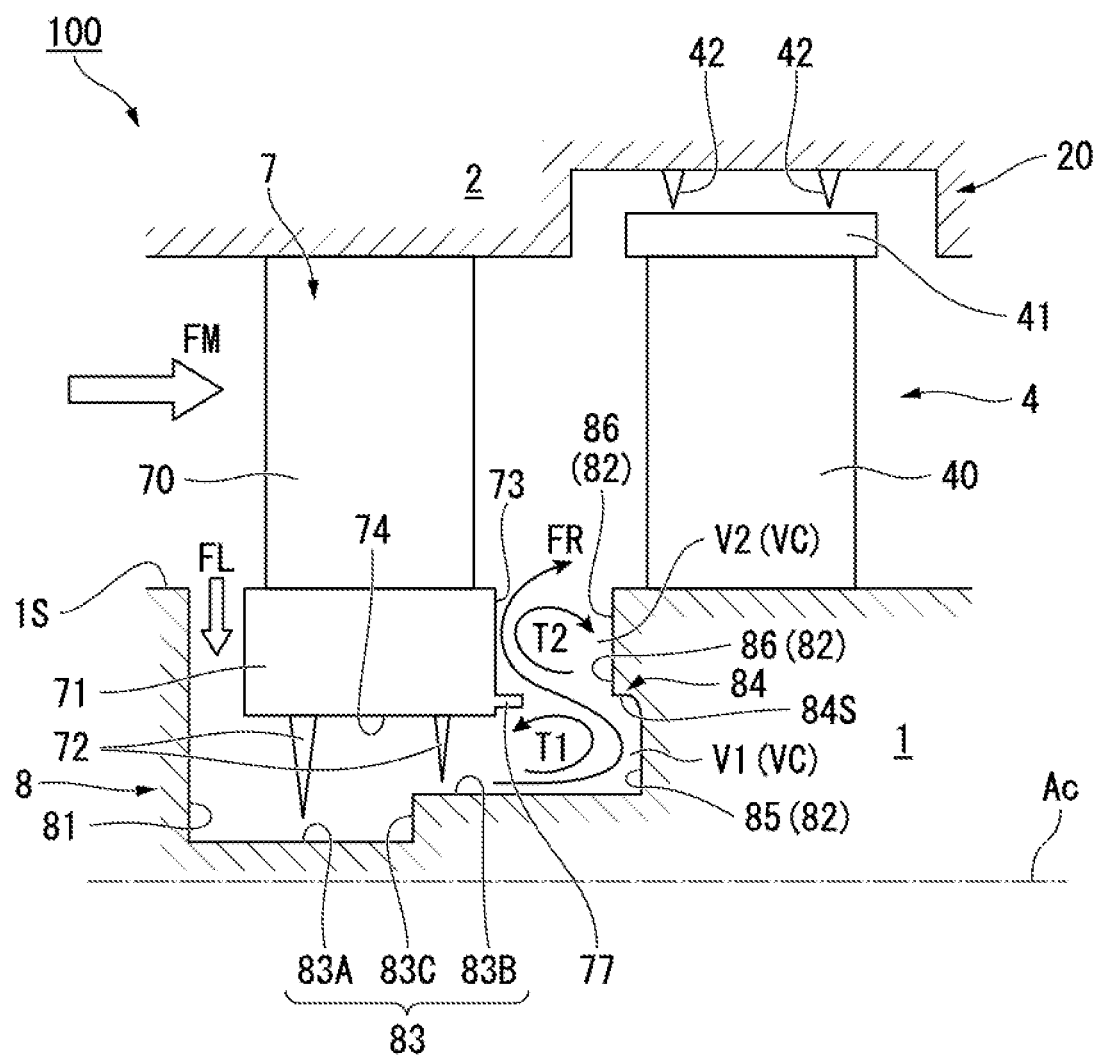
FIG. 8 is an enlarged view of a main portion of a steam turbine according to a seventh embodiment of the present invention.

Subsequently, a seventh embodiment of the present invention will be described with reference to FIG. 8. In addition, the same reference numerals are assigned to the same configurations as those of the above-described embodiments, and detailed descriptions thereof are omitted. As shown in FIG. 8, in the steam turbine 100 according to the present embodiment, a shroud protrusion portion 77 different from the shroud protrusion portion 76 is formed on the shroud radial wall surface 73 of the stator blade shroud 71, and the downstream surface 82 is similarly configured as that of the fourth embodiment. The shroud protrusion portion 77 is formed in a radially inner region in the shroud radial wall surface 73 of the stator blade shroud 71. The shroud protrusion portion 77 is provided radially inside the protrusion surface 84S.

According to this configuration, the vortexes having different swirl directions can be formed in the spaces (first space V1 and second space V2) surrounded by the shroud radial wall surface 73 and the downstream surface 82 in the axis Ac direction. Particularly, the second vortex T2 which is formed in the second space V2 positioned on the radially outer side joins the main flow FM flowing through the portion between the stator blade 7 and the rotating blade 4 without being orthogonal to the main flow FM. In addition, the shroud protrusion portion 77 is formed, and thus, the flow of the first vortex T1 can be more smoothly guided. That is, a dissipation of the vortex is reduced, and it is possible to stably form the vortex. Accordingly, it is possible to reduce the mixture loss in the steam turbine 100.

Eighth Embodiment

Figure 9:
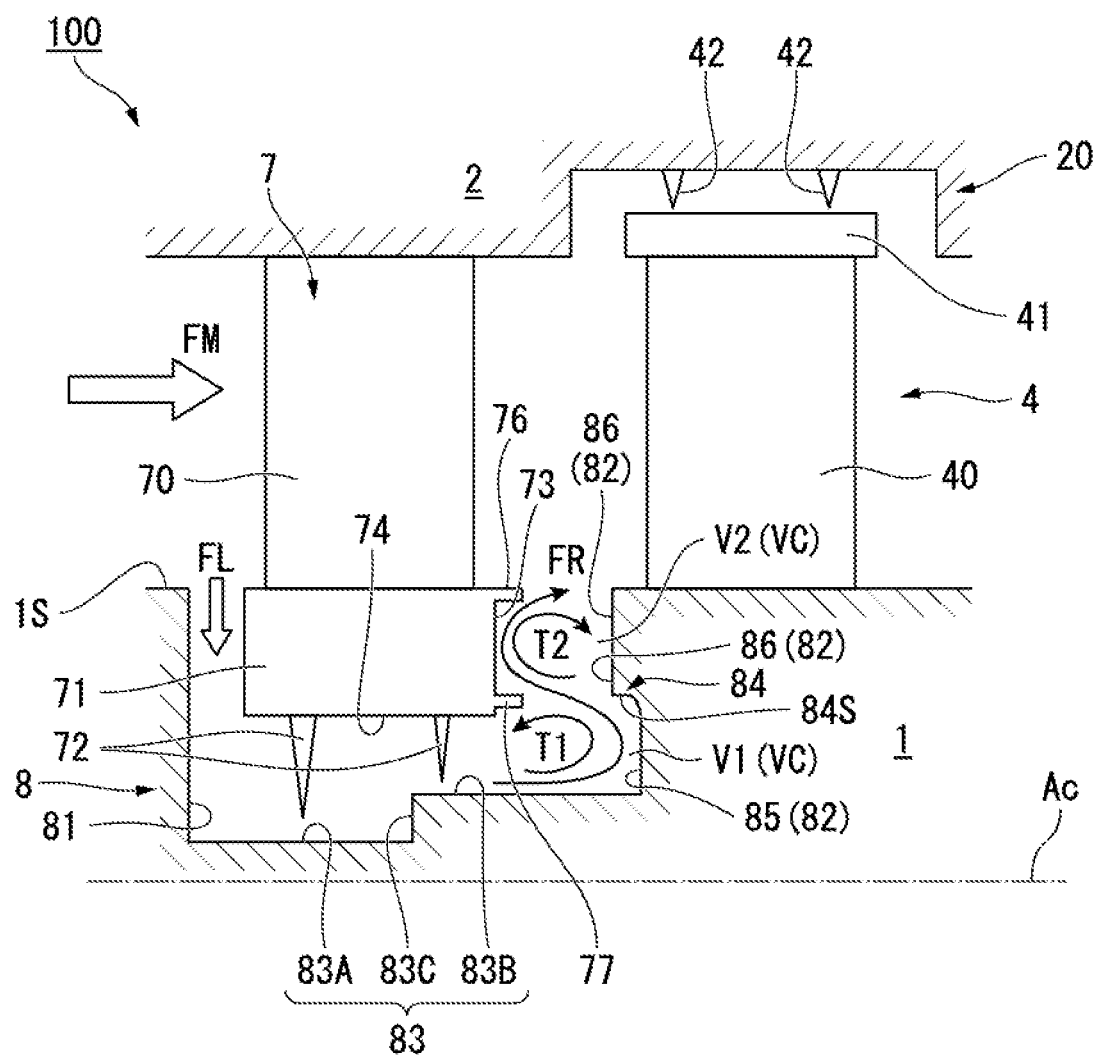
FIG. 9 is an enlarged view of a main portion of a steam turbine according to an eighth embodiment of the present invention.

Subsequently, an eighth embodiment of the present invention will be described with reference to FIG. 9. In addition, the same reference numerals are assigned to the same configurations as those of the above-described embodiments, and detailed descriptions thereof are omitted. As shown in FIG. 9, in the steam turbine 100 according to the present embodiment, the shroud protrusion portion 77 described in the seventh embodiment and the shroud protrusion portion 75 described in the third embodiment are provided on the shroud radial wall surface 73. The protrusion dimensions (the dimensions in the axis Ac direction) of the shroud protrusion portion 76 and the shroud protrusion portion 77 are the same as each other.

In addition, the second wall surface groove portion 87 described in the third embodiment is formed on the downstream surface 82, and the positions of the first wall surface 85 and the second wall surface 86 in the axis Ac direction are different horn each other. That is, the protrusion surface 84S facing the radially inner side is formed between the first wall surface 85 and the second wall surface 86.

According to this configuration, the vortexes having different swirl directions can be formed in the spaces (first space V1 and second space V2) surrounded by the shroud radial wall surface 73 and the downstream surface 82 in the axis Ac direction. Particularly, the shroud protrusion portion 76 is provided, the second vortex T2 which is formed in the second space V2 positioned on the radially outer side joins the main flow FM flowing through the portion between the stator blade 7 and the rotating blade 4 without being orthogonal to the main flow FM. In addition, the second wall surface groove portion 87 is formed, and thus, the flow of the second vortex T2 can be more smoothly guided. That is, a dissipation of the vortex is reduced, and it is possible to stably form the vortex. Accordingly, it is possible to reduce the mixture loss in the steam turbine 100.

In addition, the shroud protrusion portion 77 is formed, and thus, the flow of the first vortex T1 can be more smoothly guided. That is, a dissipation of the vortex is reduced, and it is possible to stably form the vortex. Accordingly, it is possible to reduce the mixture loss in the steam turbine 100.

Ninth Embodiment

Figure 10:
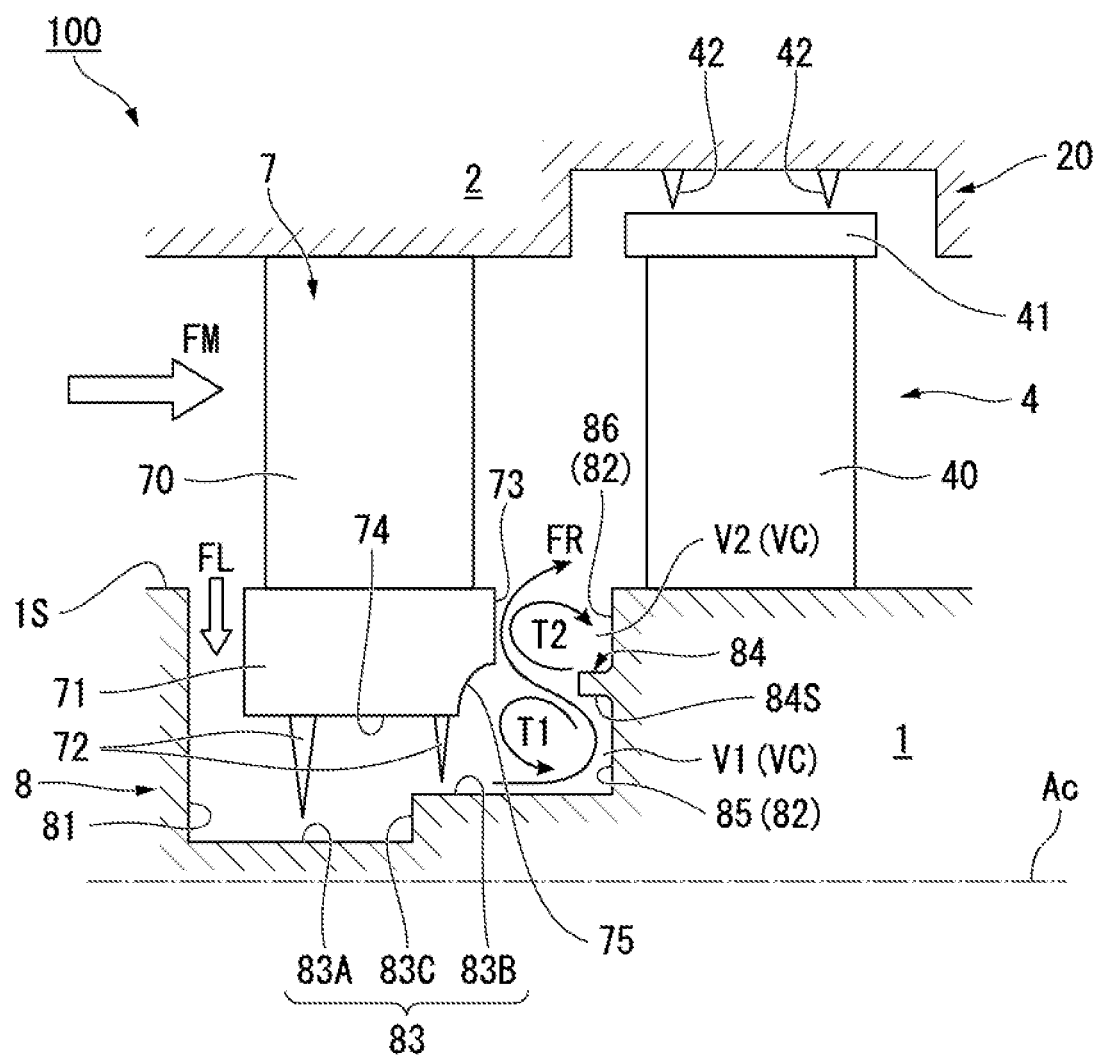
FIG. 10 is an enlarged view of a main portion of a steam turbine according to ninth embodiment of the present invention.

Subsequently a ninth embodiment of the present invention will be described with reference to FIG. 10. In addition, the same reference numerals are assigned to the same configurations as those of the above-described embodiments, and detailed descriptions thereof are omitted. As shown in FIG. 10, in the steam turbine 100 according to the present embodiment, similar to the second embodiment, the shroud groove portion 75 is formed in the stator blade shroud 71, and the protrusion portion 84 is provided on the downstream surface 82. Meanwhile, the shape of the protrusion portion 84 is different from that of the second embodiment.

More specifically, a connection portion between the protrusion portion 84 and the downstream surface 82 is formed in a curved surface. That is, an area between the first wall surface 85 of the downstream surface 82 and the radially inner surface (protrusion surface 84S) of the protrusion portion 84 is formed in a curved surface which is smoothly curved. In other words, the region is gradually curved from the downstream toward the upstream side and toward the protrusion surface 84S from the first wall surface 85.

Similarly, an area between the second wall surface 86 and the radially outer surface of the protrusion portion 84 is formed in a curved surface which is smoothly curved. In other words, the region is gradually curved from the downstream toward the upstream side ant toward the radially outer surface of the protrusion portion 84 from the second wall surface 86.

According to this configuration, the protrusion portion 84 is provided on the downstream surface 82, and thus, the two vortexes (first vortex T1 and second vortex T2) having different swirl directions can be finned in the convection space VC (first space V1 and second space V2). In addition, the first vortex T1 funned in the first space V1 is captured by the shroud groove portion 75 when the first vortex T1 flows from the downstream surface 82 (first wall surface 85) toward the shroud radial wall surface 73. Accordingly it is possible to more smoothly guide the flow of the first vortex T1. That is, a dissipation of the first vortex T1 from the first space V1 to other areas is reduced. In addition, the connection portion between the protrusion portion 84 and the downstream surface 82 is formed in a curved surface, and thus, it is possible to more smoothly guide the first vortex T1 and the second vortex T2 along the curved surface shape.

Tenth Embodiment

Figure 11:
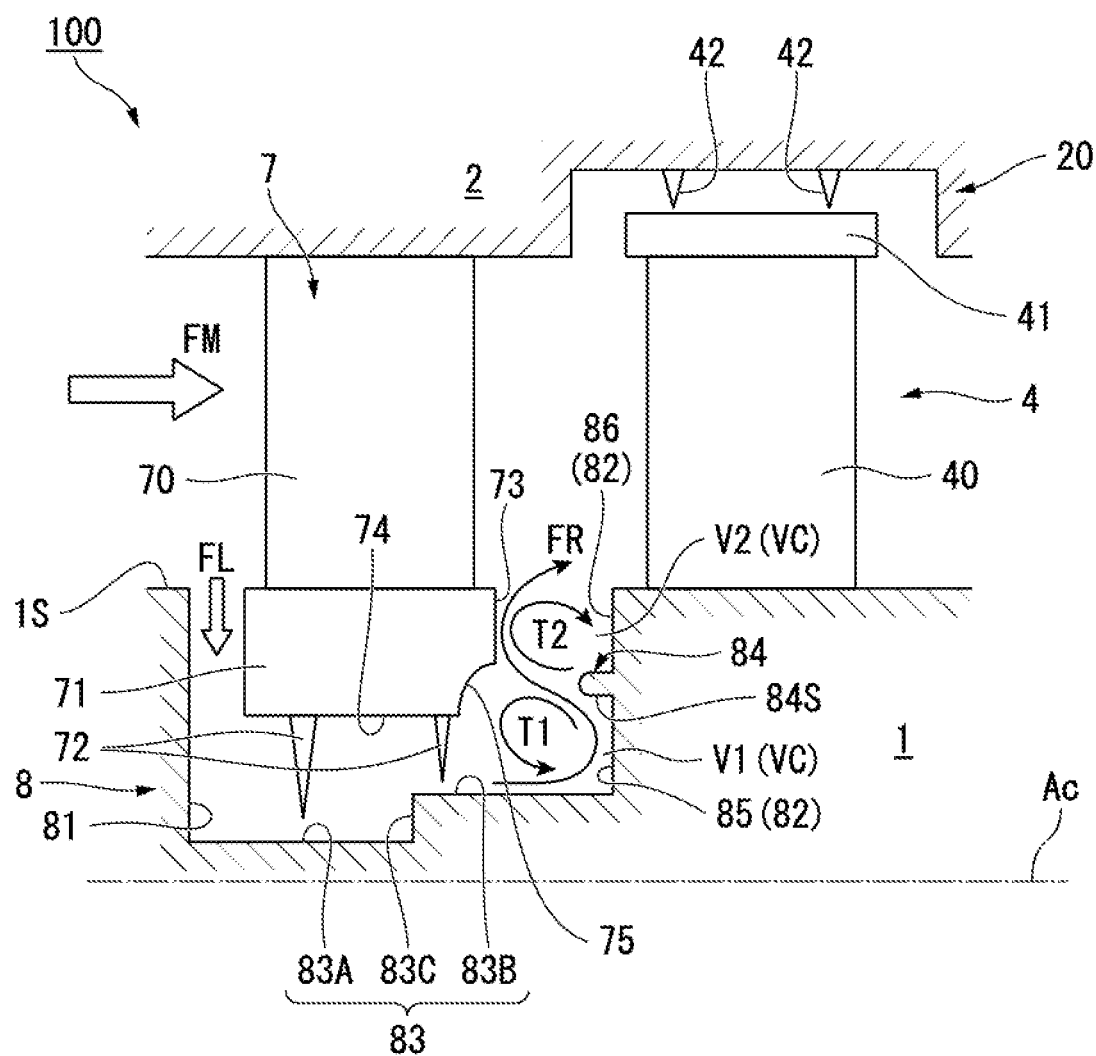
FIG. 11 is an enlarged view of a main portion of a steam turbine according to a tenth embodiment of the present invention.

Subsequently, a tenth embodiment of the present invention will be described with reference to FIG. 11. In addition, the same reference numerals are assigned to the same configurations as those of the above-described embodiments, and detailed descriptions thereof are omitted. As shown in FIG. 11, in the steam turbine 100 according to the present embodiment, similar to the second embodiment, the shroud groove portion 75 is formed in the stator blade shroud 71, and the protrusion portion 84 is provided on the downstream surface 82. Meanwhile, the shape of the protrusion portion 84 is different from that of the second embodiment.

More specifically, an upstream end portion of the protrusion portion 84 is curved in an arc shape. That is, the protrusion portion 84 protrudes from the downstream surface 82 toward the upstream side and the upstream end portion of the protrusion portion 84 is obtuse headed shape. In other words, the radially inner surface (protrusion surface 84S) of the protrusion portion 84 and the upstream end surface of the protrusion portion 84 and the radially outer surface of the protrusion portion 84 and the upstream end surface of the protrusion portion 84 are respectively connected to each other in a curved shape when viewed in the radial direction.

According to this configuration, the protrusion portion 84 is provided on the downstream surface 82, and thus, the two vortexes (first vortex T1 and second vortex T2) having different swirl directions can be formed in the convection space VC (first space V1 and second space V2). In addition, the first vortex T1 formed in the first space V1 is captured by the shroud groove portion 75 when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced. In addition, in the present embodiment, the upstream end portion of the protrusion portion 84 is curved. Accordingly, compared to a case where a corner portion is formed on the end portion, it is possible to reduce a possibility that separation occurs in the flows of the first vortex T1 and the second vortex T2.

Eleventh Embodiment

Figure 12:
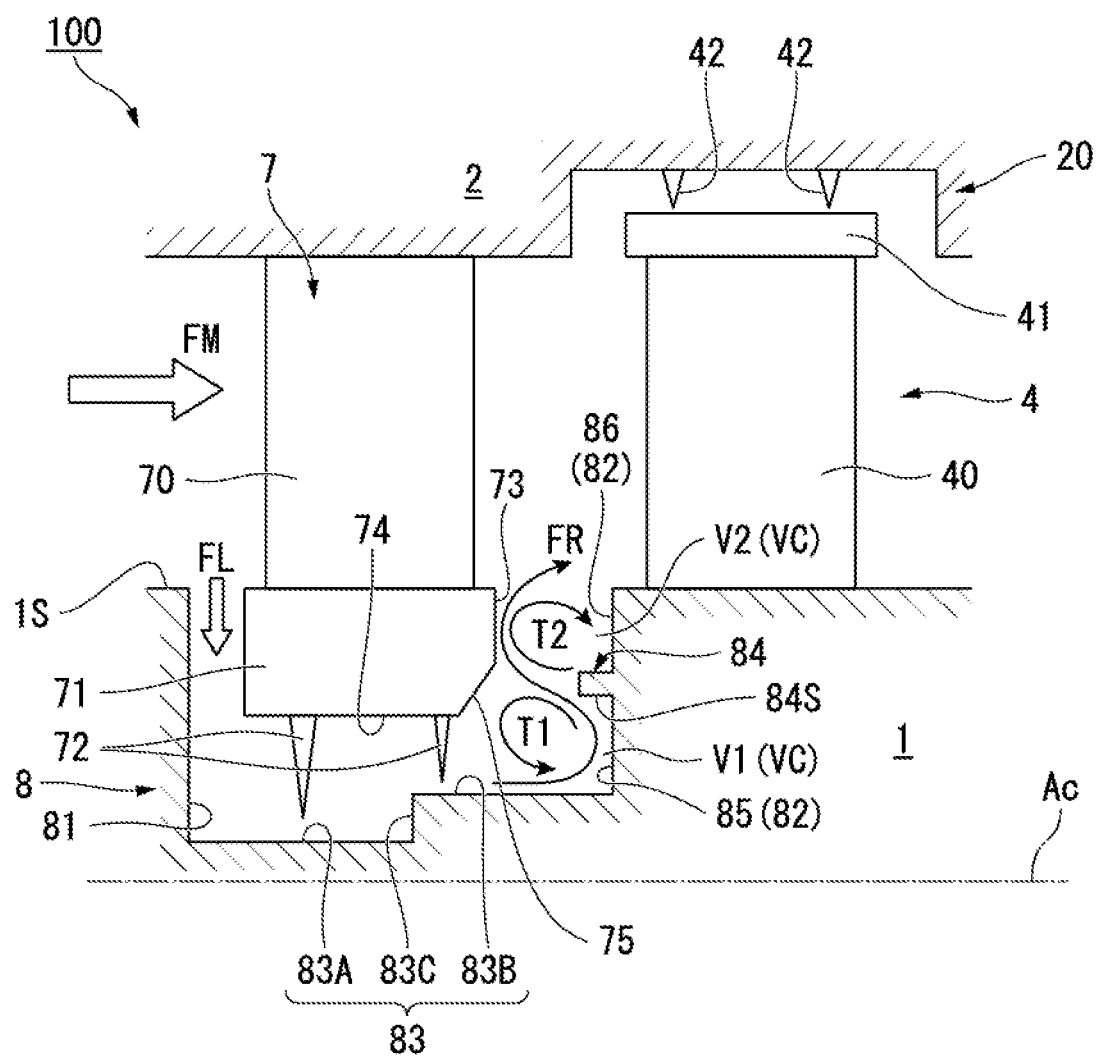
FIG. 12 is an enlarged view of a main portion of a steam turbine according to an eleventh embodiment of the present invention.

Next, an eleventh embodiment of the present invention will be described with reference to FIG. 12. In addition, the same reference numerals are assigned to the same configurations as those of the above-described embodiments, and detailed descriptions thereof are omitted. As shown in FIG. 12, in the steam turbine 100 according to the present embodiment, similar to the second embodiment, the shroud groove portion 75 is formed in the stator blade shroud 71, and the protrusion portion 84 is provided on the downstream surface 82. Meanwhile, the shape of the shroud groove portion 75 is different from that of the second embodiment.

More specifically, a surface of the shroud groove portion 75 facing the downstream side is formed in a flat shape which is inclined to the shroud radial wall surface 73 and the inner peripheral surface 74. In other words, the surface of the shroud groove portion 75 is inclined outward from the radially inner side, and toward the downstream side from the upstream side.

According to this configuration, the protrusion portion 84 is provided on the downstream surface 82, and thus, the two vortexes (first vortex T1 and second vortex T2) having different swirl directions can be formed in the convection space VC (first space V1 and second space V2). In addition, the first vortex T1 formed in the first space V1 is captured by the shroud groove portion 75 when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced. In addition, in the present embodiment, the surface of the shroud groove portion 75 facing the downstream side is formed in a flat shape which is inclined to the shroud radial wall surface 73 and the inner peripheral surface 74. Accordingly, compared to a case where a curved surface is machined so as to form the shroud groove portion 75, it is possible more easily obtain the shroud groove portion 75.

Twelfth Embodiment

Figure 13:
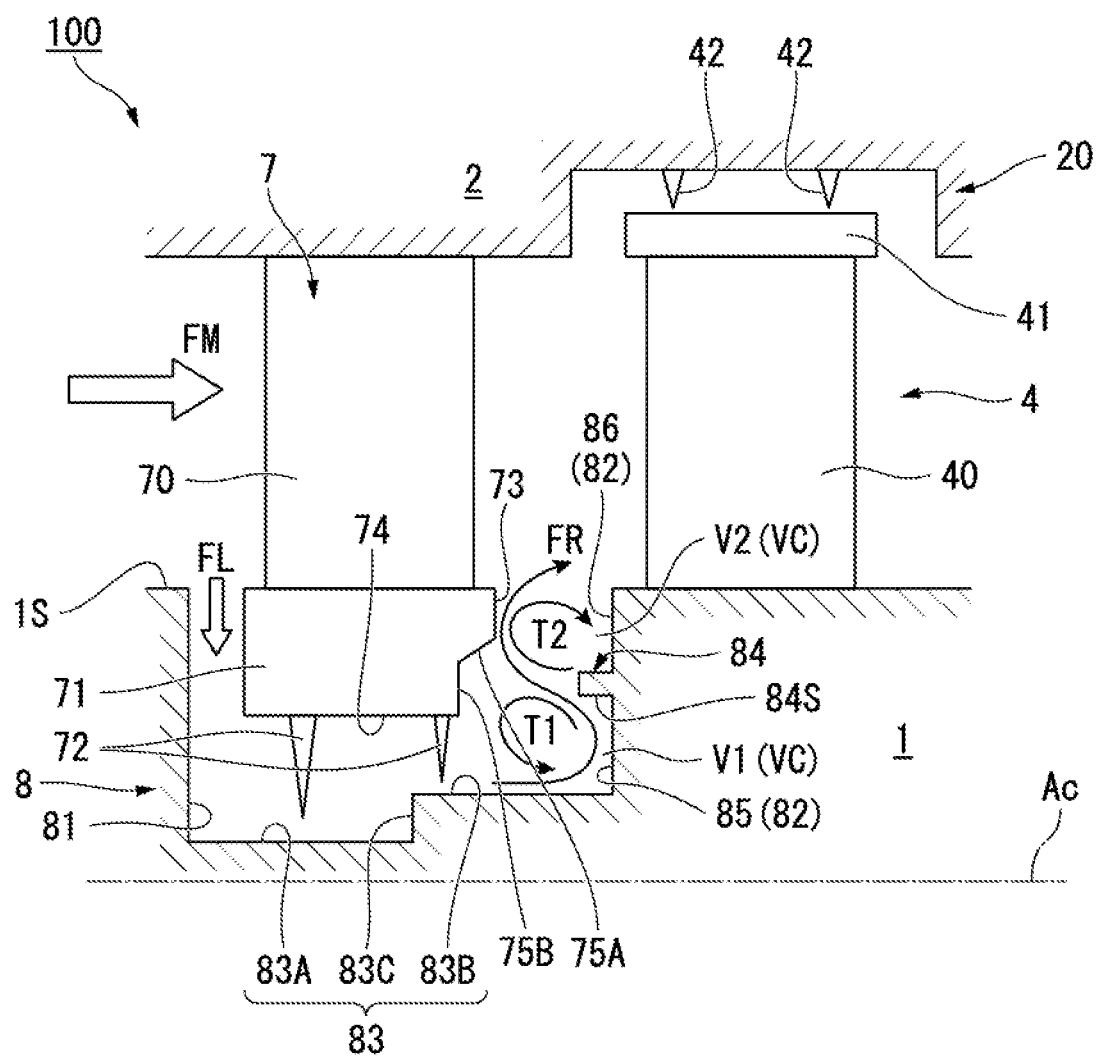
FIG. 13 is an enlarged view of a main portion of a steam turbine according to a twelfth embodiment of the present invention.

Next, a twelfth embodiment of the present invention will be described with reference to FIG. 13. In addition, the same reference numerals are assigned to the same configurations as those of the above-described embodiments, and detailed descriptions thereof are omitted. As shown in FIG. 13, in the steam turbine 100 according to the present embodiment, similar to the second embodiment, the shroud groove portion 75 is formed in the stator blade shroud 71, and the protrusion portion 84 is provided on the downstream surface 82. Meanwhile, the shape of the shroud groove portion 75 is different from that of the second embodiment.

More specifically, a surface of the shroud groove portion 75 facing the downstream side is formed by two flat surfaces intersecting each other. More specifically, the surface facing the downstream side includes an inclined surface 75A and a vertical surface 75B. The inclined surface 75A extends in a flat surface shape inward from the radially outer side and from the downstream side toward the upstream side. The vertical surface 75B extends in the radial direction of the axis Ac from a radially inner end edge of the inclined surface 75A. A radially inner end edge of the vertical surface 75B is connected to the inner peripheral surface 74 of the stator blade shroud 71.

According to this configuration, the protrusion portion 84 is provided on the downstream surface 82, and thus, the two vortexes (first vortex T1 and second vortex T2) having different swirl directions can be formed in the convection space VC (first space V1 and second space V2). In addition, the first vortex T1 formed in the first space V1 is captured by the shroud groove portion 75 when the first vortex T1 flows from the downstream surface 82 (first wall surface 85) toward the shroud radial wall surface 73. Accordingly, it is possible to more smoothly guide the flow of the first vortex T1. That is, a dissipation of the first vortex T1 from the first space V1 to other areas is reduced. In addition, the shroud groove portion 75 is formed by the inclined surface 75A and the vertical surface 75B. Compared to the case where the curved surface is machined, both the inclined surface 75A and the vertical surface 75B are formed in a flat surface shape, and thus, it is possible to more easily obtain the shroud groove portion 75.

Hereinbefore, respective embodiments of the present invention are described. In addition, the configurations are examples, and various modifications can be applied to the present invention within the scope which does not depart from the gist of the present invention.

For example, the respective embodiments are described based on the example in which the steam turbine 100 is applied as the rotary machine. However, the aspect of the rotary machine is not limited to the steam turbine 100, and other devices such as a gas turbine can be applied as the rotary machine as it belongs to a wide range of turbo machines.

In addition, the number of rotating blade rows 3, the number of the stator blade rows 6, the number of the fins, or the like in the steam turbine 100 is not limited to the above-described embodiments, and may be appropriately determined according to design or specifications.

INDUSTRIAL APPLICABILITY

According to the rotary machine, it is possible to reduce the mixture loss to improve the efficiency of the steam turbine.

REFERENCE SIGNS LIST

1: rotor
1S: outer peripheral surface
2: casing
3: rotating blade row
4: rotating blade
5: bearing device
5A: journal bearing
5B: thrust bearing
6: stator blade row
7: stator blade
8: recessed portion
10: suction port
11: exhaust port
20: rotating blade accommodation portion
40: rotating blade body
41: rotating blade shroud
42: rotating blade-side fin
70: stator blade body
71: stator blade shroud
72: stator blade-side fin
73: shroud radial wall surface
74: inner peripheral surface
75: shroud groove portion
75A: inclined surf ice
75B: vertical surface
76: shroud protrusion portion
77: shroud protrusion portion
81: upstream surface
82: downstream surface
83: bottom surface
83A: first bottom surface
83B: second bottom surface
83C: step portion
84: protrusion portion
84S: protrusion surface
85: first wall surface
86: second wall surface
87: second wall surface groove portion
100: steam turbine
Ac: axis
FL: leakage flow
FM: main flow
FR: return flow
T1: first vortex
T2: second vortex
V1: first space
V2: second space
VC: convection space

What is claimed is:

1. A rotary machine comprising:
a casing in which fluid is introduced;
a rotor which rotates around an axis and includes a recessed portion formed on an outer peripheral surface of the rotor;
a stator blade which includes a stator blade body which extends inward from a radially outer side of the axis and a shroud which is provided radially inside the stator blade body to be accommodated in the recessed portion; and
a fin which protrudes from an inner peripheral surface facing a radially inner side of the shroud toward a bottom surface of the recessed portion, a clearance being formed between the bottom surface and the fin,
wherein the fluid forms a main flow by flowing toward a downstream side via the stator blade,
wherein a component except for the main flow in the fluid flowing from an upstream side forms leakage flow by flowing toward the recessed portion,
wherein the recessed portion includes a recessed portion radial wall surface, which extends in a radial direction, on an axially downstream side,
wherein the recessed portion radial wall surface includes a first wall surface which extends radially outward from the bottom surface, a second wall surface which extends further radially outward than the first wall surface, and a protrusion surface which protrudes toward an axially upstream side from the first wall surface between the first wall surface and the second wall surface,
wherein the shroud includes a shroud radial wall surface facing the recessed portion radial wall surface,
wherein the shroud includes a shroud groove portion which is connected to the inner peripheral surface of the shroud radially inward from a portion of the shroud radial wall surface radially outside the protrusion surface of the recessed portion radial wall surface so as to retract from the shroud radial wall surface,
wherein the protrusion surface divides a space between the shroud radial wall surface and the recessed portion radial wall surface into a first space positioned radially inside the protrusion surface and a second space positioned radially outside the first space in a state where the protrusion surface is interposed between the first space and the second space so as to form a return flow includes vortexes having different swirl directions in the first space and the second space,
wherein the vortex formed in the second space in the return flow has the swirl direction along a flow direction of the main flow, and wherein the protrusion faces the shroud groove portion from the downstream side.

2. The rotary machine according to claim 1,
wherein a surface of the shroud groove portion facing a downstream side includes an inclined surface which extends radially inward from the shroud radial wall surface toward an upstream side and a vertical surface which extends radially inward from a radially inner end edge of the inclined surface and is connected to an inner peripheral surface of the shroud.

3. The rotary machine according to claim 1, further comprising:
a shroud protrusion portion which is provided on the shroud radial wall surface and protrudes toward the axially downstream side.

4. The rotary machine according to claim 1,
wherein a second wall surface groove portion, which is connected to the outer peripheral surface radially outward from the second wall surface so as to retract from the second wall surface, is formed on the second wall surface.

5. The rotary machine according to claim 1,
wherein the first wall surface and the second wall surface are provided at the same position in the axis direction, a protrusion portion protruding toward the axially upstream side is formed between the first wall surface and the second wall surface, and the protrusion surface forms a radially inner surface of the protrusion portion.

6. The rotary machine according to claim 1,
wherein the first wall surface is provided on a downstream side of the second wall surface in the axis direction, and the protrusion surface connects a radially outer end portion of the first wall surface and a radially inner wall end portion of the second wall surface to each other.

\* \* \* \* \*